US009387470B2

(12) United States Patent
Song et al.

(10) Patent No.: US 9,387,470 B2
(45) Date of Patent: Jul. 12, 2016

(54) SULFUR-TOLERANT AND CARBON-RESISTANT CATALYSTS

(75) Inventors: Chunshan Song, State College, PA (US); James J. Strohm, West Richland, WA (US); Jian Zheng, Williamsville, NY (US); Weidong Gu, Toronto (CA); Chao Xie, State College, PA (US); Xiaoxing Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1564 days.

(21) Appl. No.: 12/007,983

(22) Filed: Jan. 17, 2008

(65) Prior Publication Data

US 2008/0265212 A1 Oct. 30, 2008

Related U.S. Application Data

(60) Provisional application No. 60/881,158, filed on Jan. 19, 2007.

(51) Int. Cl.
*B01J 23/00* (2006.01)
*B01J 23/58* (2006.01)
*B01J 37/02* (2006.01)
*B01J 23/60* (2006.01)
*B01J 23/62* (2006.01)
*B01J 23/652* (2006.01)
*B01J 23/89* (2006.01)
*C01B 3/38* (2006.01)
*C01B 3/40* (2006.01)
*B01J 21/04* (2006.01)
*B01J 37/00* (2006.01)

(52) U.S. Cl.
CPC .............. *B01J 37/0207* (2013.01); *B01J 23/60* (2013.01); *B01J 23/62* (2013.01); *B01J 23/6525* (2013.01); *B01J 23/89* (2013.01); *B01J 23/892* (2013.01); *B01J 23/894* (2013.01); *B01J 23/896* (2013.01); *B01J 23/8946* (2013.01); *C01B 3/38* (2013.01); *C01B 3/382* (2013.01); *C01B 3/40* (2013.01); *B01J 21/04* (2013.01); *B01J 23/8913* (2013.01); *B01J 37/0009* (2013.01); *B01J 37/0236* (2013.01); *C01B 2203/0233* (2013.01); *C01B 2203/0244* (2013.01); *C01B 2203/066* (2013.01); *C01B 2203/1047* (2013.01); *C01B 2203/1058* (2013.01); *C01B 2203/1082* (2013.01); *C01B 2203/1211* (2013.01)

(58) Field of Classification Search
USPC ......... 502/304, 325, 326, 328, 330, 337, 327, 502/335, 300
See application file for complete search history.

(56) References Cited

U.S. PATENT DOCUMENTS

| 4,693,882 | A | | 9/1987 | Setzer et al. |
| 4,844,837 | A | * | 7/1989 | Heck ........................ B01J 8/025 252/373 |
| 5,169,813 | A | | 12/1992 | Miller et al. |
| 6,296,822 | B1 | | 10/2001 | Hepburn et al. |
| 2004/0127351 | A1 | * | 7/2004 | Basile .................... B01J 23/002 502/303 |
| 2004/0147394 | A1 | * | 7/2004 | Wagner et al. ................. 502/325 |
| 2004/0266615 | A1 | * | 12/2004 | Watson ............... B01J 19/0093 502/325 |
| 2005/0054738 | A1 | * | 3/2005 | Fraenkel .................. B01J 23/83 518/716 |
| 2006/0216227 | A1 | * | 9/2006 | Idem ..................... B01J 21/066 423/651 |

FOREIGN PATENT DOCUMENTS

WO WO/2004/023581 3/2004

OTHER PUBLICATIONS

Osaki et al, Role of Potassium in Carbon-Free CO2 Reforming of Methane of K-promoted Ni/Al2O3 Calalysts, Aug. 3, 2001, Journal of Catalysis, 204, pp. 89-97.*
Kugai et al., Low-temperature reforming of ethanol over CeO2-supported Ni-Rh bimetallic catalysts for hydrogen production, 2005, Catalysis letters, vol. 101, 255-264.*
Piras et al., Remarkable stablization of transition alumina operated by ceria under reducing and redox conditions, 2000, Applied Catalysis B: Environmental, 28, 77-81.*
Aupretre et al., Bio-ethanol catalytic steam reforming over supported metal catalysts, 2002, Catalysis communications , 3, 263-267.*
Alstnlp et al., Applied Catalysis, 1 (1981) 303.
Andresen et al., Energy & Fuels, 15 (2001) 714.
Annor, Applied Catalysis A: General, 176 (1999) 159.
Babich et al., Fuel, 82 (2003) 607.
Borowiecki et al., Studies in Surface Science and Catalysis, 88 (1994) 537.
Christensen, Applied Catalysis, A: General, 138 (1996) 285.
Delallay et al., Applied Catalysis, 53 (1989) 95.
Dietor et al.,, Journal of Physical Chemistry, 93 (1989) 5846.
Duprez et al., Applied Catalysis, 27 (1986) 145.
Erley, et al., Journal of Catalysis, 53 (1978) 287.
Farrauto, et al., Annual Review of Materials Research, 33 (2003).

(Continued)

*Primary Examiner* — James McDonough
(74) *Attorney, Agent, or Firm* — Law Offices of John A. Parrish

(57) ABSTRACT

The invention relates to novel bimetallic and trimetallic catalysts, their manufacture and use in both steam reforming and oxidative steam reforming of liquid fuels such as jet fuels, diesel fuels and gasoline to produce synthesis gas and/or hydrogen for fuel cell applications. The invention further relates to manufacture of synthesis gas and/or hydrogen gas for chemicals synthesis and fuel processing. The catalysts have high sulfur tolerance and carbon resistance when used in steam reforming and/or oxidative steam reforming of heavy hydrocarbon fuels.

3 Claims, No Drawings

(56) References Cited

OTHER PUBLICATIONS

Hov et al., Catalysis Letters, 89 (2003) 193.
Kim et al., Energy & Fuels, 19 (2005) 353.
Kurungot et al., Catalysis Letters, 92 (2004) 181.
Ma et al., Applied Catalysis B: Environmental, 56 (2005) 137.
Ma et al., Catalysis Today, 77 (2002) 107.
Ma et al., Industrial & Engineering Chemistry Research, 44(2005) 5768.
Oyama, Journal of Catalysis, 216 (2003) 343.
Rostrup-Nielsen, Journal of Catalysis, 11 (1968) 220.
Rostrup-Nielsen, Journal of Catalysis, 21 (1971) 171.
Rostrup-Nielsen et al., Journal of Catalysis, 48 (1977) 155.
Rostrup-Nielsen et al., Journal of Catalysis, 59 (1979) 395.
Rostrup-Nielsen, NATO Advanced Study Institutes Series, Series E: Applied Sciences, 54 (1982) 127.
Rostrup-Nielsen, NATO Advanced Study Institutes Series~ Series E: Applied Sciences, 54 (1982) 209.
Rostrup-Nielsen, Catalysis Today, 18 (1994) 305.
Rostrup-Nielsen, Catalysis Today, 37 (1997) 225.
Rostrup-Nielsen et al., Studies in Surface Science and Catalysis, 113 (1998) 81.
Rostrup-Nielsen, Physical Chemistry Chemical Physics, 3 (2001) 283.
Song et al., Am. Chem. Soc. Div. Petrol. Chem.Prepr., 37 (1992) 484.
Song et al., Industrial & Engineering Chemistry Research, 33 (1994) 534.
Song et al., Applied Catalysis B: Environmental, 41 (2003) 207.
Song, Catalysis Today, 86 (2003) 211.
Strohm et al., Preprints of Symposia—American Chemical Society, Division of Fuel Chemistry, 48 (2003) 857.
Strohm et al., Preprints of Symposia—American Chemical Society, Division of Fuel Chemistry, 48 (2003) 931.
Strohm et al, J. of Catalysis, pp. 309-320, published on line Jan. 20, 2006.
Topsoe et al.,Hydrotreating Catalysis, edt S. a.Technology. 1996, Berlin: Springer-Verlag.
Trimm, Catalysis Reviews—Science and Engineering, 16 (1977) 155.
Trimm, Catalysis Today, 37 (1997) 233.
Trimm, Catalysis Today, 49 (1999) 3.
Trimm, et al., Catalysis Reviews—Science and Engineering, 43 (2001) 31.
Trovarelli et al., Journal of Catalysis, 151(1995) 111.
Trovarelli et al.,, Journal of Alloys and Compounds, 323-324 (2001) 584.
Velu et al., Industrial & Engineering Chemistry Research, 42 (2003) 5293.
Velu et al., Energy & Fuels, 19 (2005) 1116.
Velu, et al., Industrial & Engineering Chemistry Research, 44 (2005) 5740.
Whitehurst et al., Adv. Catal., 42 (1998) 345.
Yoon et al., Energy &Fuels, 10 (1996) 806.
Yoon et al., Surface Science, 395 (1998) 268.
Zhang et al., Surface Science, 432 (1999) 305.
Song et al, Catalysis Today, 77(2002) pp. 17-49.
Xu, Prapn, Pap.—Am. Chem. Soc. 2004, 49 LD 259.
Song, Studies in Surface Science and Catalysis, 153 (2004) 411.
Xu, Int. J. Env. Tech. and µ67, vol. 4, (2004) 32.

\* cited by examiner

SULFUR-TOLERANT AND CARBON-RESISTANT CATALYSTS

CROSS REFERENCE TO RELATED APPLICATION

This application claims priority to U.S. provisional application Ser. No. 60/881,158 filed Jan. 19, 2007.

GOVERNMENT INTERESTS

This invention was made with government support under Contract No. MDA972-01-C-0066, awarded by the DARPA. The Government has certain rights in the invention.

BACKGROUND OF THE INVENTION

Hydrogen based fuel cells are attracting widespread interest due to their high efficiency and potential for environmental soundness. A limitation to commercial adoption of hydrogen based fuel cells, however, is the production and storage of hydrogen. Hydrogen-based fuel cells currently require systems which can store hydrogen. This, however, is inefficient. Furthermore, there currently is no hydrogen infrastructure in the United States or any other part of the world. Thus, even if problems associated with hydrogen storage are solved, hydrogen fuel itself is not readily available.

On-board or on-site hydrogen production from fuels such as gasoline, jet fuel or diesel fuel offers an efficient and practical means to produce hydrogen for fuel cells. Current art limitations to on-board or on-site manufacture of hydrogen, however, include rapid catalytic deactivation due to carbon formation and/or sulfur poisoning.

A need therefore exists for sulfur-tolerant catalysts for hydrocarbon reforming which also are resistant to carbon formation.

SUMMARY OF THE INVENTION

The invention relates to novel bimetallic and trimetallic catalysts, their manufacture and use in both steam reforming and oxidative steam reforming of liquid fuels such as jet fuels, diesel fuels and gasoline to produce synthesis gas and/or hydrogen for fuel cell applications. The invention further relates to manufacture of synthesis gas and/or hydrogen gas for chemicals synthesis and fuel processing. The catalysts have high sulfur tolerance and carbon resistance when used in steam reforming and/or oxidative steam reforming of heavy hydrocarbon fuels.

The novel catalysts may be used to convert liquid hydrocarbon fuels to hydrogen at low temperatures of about 500° C. to about 600° C. under steam reforming conditions as well as under oxidative steam reforming conditions. Lower fuel decomposition during mixing and preheating of the fuels, lower energy usage during reforming, as well as higher yield of hydrogen per unit of hydrocarbon fuels also may be achieved.

The bimetallic and trimetallic catalysts are sulfur tolerant and resist carbon formation during steam reforming and/or oxidative steam reforming of various transportation fuels. The catalysts are highly active for low temperature reforming of liquid fuels which contain sulfur and carbon-forming compounds.

The invention achieves noble-metal based and non-noble-metal based bimetallic and/or trimetallic catalysts on an alumina support or on a R metal oxide stabilized alumina support where R is any one of Ce, Zr, Ga, La, Y or mixtures thereof.

The first metal component of the bimetallic and trimetallic nobel-metal based catalysts is a precious metal such as Rh, Ru or Pt, preferably Rh. The second component in noble-metal based bimetallic catalysts is a transition metal such as Ni, Co, Fe, Mo, Cu, Zn, preferably Ni, Co, Fe, Zn, most preferably Ni, which protects the noble metal from sulfur poisoning. The second and third metals in the noble metal based trimetallic catalysts may be a combination of two transition metals such as Ni—Co, Ni—Fe, Ni—Zn, Ni—Mo, Ni—Cu, preferably Ni—Co, Ni—Fe, Ni—Zn, more preferably Ni—Co, which also protect the nobel metal from sulfur poisoning and from carbon deposition to achieve high catalytic activity, high sulfur tolerance and high carbon resistance. Useful noble metal based trimetallic catalysts include but are not limited to Rh—Ni—Co catalyst. In non-noble-metal based catalysts, the first metal component of the bimetallic and trimetallic catalysts preferably is Ni metal. The second and the third components may be a transition metal such as Co, Fe, Mo, Cu, Zn, preferably Co, Fe, Zn or mixtures thereof, most preferably Co which, when employed in combination are capable of minimizing sulfur poisoning and carbon formation during reforming.

The noble-metal based, bimetallic catalysts have the formula M1(x)M2(y) where $0.5\% \leq x \leq 5\%$ and $2\% \leq y \leq 20\%$ where all amount are based on the total weight of the catalyst including support and where M1 is Rh, Ru or Pt and M2 is Ni, Co, Fe, Mo, Cu or Zn. The bimetallic catalysts may include an alkaline earth modifier metal such as Ca, K or mixtures thereof. The noble-based, trimetallic catalysts have the formula M1(x)M2(y)M3(z) where $0.5\% \leq x \leq 5\%$, $2\% \leq y \leq 20\%$ and $2\% \leq z \leq 20\%$ where all amounts are based on the total weight of the catalyst, including support, and where M1 is Rh, Ru or Pt and M2 and M3 are different and each of M2 and M3 may be Ni, Co, Fe, Mo, Cu or Zn. The non-noble-metal based catalysts have the formula N1(x)N2(y) where $5\% \leq x \leq 40\%$ and $5\% \leq y \leq 20\%$ where all amounts are based on the total weight of the catalyst including support, and where N1 is Ni and N2 is Co, Fe, Mo, Cu, Zn or mixtures thereof.

The support materials employed in the catalysts are selected to promote low temperature steam reforming of liquid hydrocarbons. The support material preferably is gamma alumina ($\gamma$-$Al_2O_3$), which may be doped with a dopant rare earth oxide such as any of $CeO_2$, $Y_2O_3$, $ZrO_2$, $LaO_2$, $Ga_2O_3$ or combinations thereof. The doped gamma alumina support may be further modified by addition of one or more other oxides such as $Y_2O_3$, $CeO_2$, $ZrO_2$, $K_2O$, $Na_2O$, MgO, CaO or SrO or mixtures thereof.

The invention also provides a method of steam reforming of hydrocarbon fuels containing sulfur. The method generally entails heating any of bimetallic catalysts of the formula M1(x)M2(y) where $0.5\% \leq x \leq 5\%$ and $2\% \leq y \leq 20\%$ where all amounts are based on the total weight of the catalyst including support, and where M1 is selected from the group consisting of Rh, Ru, Pt or mixtures thereof and M2 is selected from the group consisting of Ni, Co, Fe, Mo, Cu, Zn or mixtures thereof or trimetallic catalyst of the formula M1(x)M2(y)M3(z) where $0.5\% \leq x \leq 5\%$, $2\% \leq y \leq 20\%$ and $2\% \leq z \leq 20\%$ where all amounts are based on the total weight of the catalyst including support, and where M1 is selected from the group consisting of Rh, Ru, Pt or mixtures thereof, M2 and M3 are different and each is selected from the group consisting of Ni, Co, Fe, Mo, Cu, Zn or mixtures on a R stabilized alumina support, where R is selected from the group consisting of Ce, Zr, Ga, La, Y or mixtures thereof in a reducing atmosphere to yield an activated catalyst, and then passing a liquid hydrocarbon fuel which may contain sulfur over the activated catalyst at an elevated temperature to produce hydrogen and/or synthesis gas for applications.

The catalysts such as Rh—Ni, Rh—Ni—Co on support materials may be employed in reforming applications as well as in automotive, portable power, stationary power, home power generation, military applications, as well as other sectors where hydrogen generation is desired.

DETAILED DESCRIPTION OF THE INVENTION

Generally, the noble-metal based bimetallic catalysts of the formula M1(x)M2(y) where $0.5\% \leq x \leq 5\%$ and $2\% \leq y \leq 20\%$, the noble-metal based trimetallic catalysts of the formula M1(x)M2(y)M3(z) where $0.5\% \leq x \leq 5\%$, $2\% \leq y \leq 20\%$ and $2\% \leq z \leq 20\%$ and the non-noble-metal based catalysts of the formula N1(x)N2(y) where $5\% \leq x \leq 40\%$ and $5\% \leq y \leq 20\%$ where all amounts are based on the total weight of the catalyst including support are made by wet impregnation of metal precursors onto a support material such as, gamma alumina, $CeO_2$-doped gamma alumina or $ZrO_2$-doped gamma alumina, La doped gamma alumina, Y doped gamma alumina, preferably $CeO_2$-doped gamma alumina. The support material is made by impregnating an alumina, preferably gamma alumina with a rare earth precursor salt such as cerium nitrate, lanthanum nitrate, gadolinium nitrate and zirconyl nitrate or mixtures thereof. In manufacture of the support material, gamma alumina is dried and then a desired amount of the dried gamma alumina is mixed with deionized water while stirring at about 60° C. to about 70° C. to produce an aqueous slurry of gamma alumina. An aqueous solution of a dopant precursor salt such as cerium nitrate or a mixture of dopant precursor salts such as cerium nitrate and yttrium nitrate then is added to the gamma alumina slurry while stirring at about 60° C. about 70° C. until excess water is evaporated to produce a doped support powder. The amount of dopant oxide precursor added typically is sufficient to achieve an amount of dopant oxide of about 1% to about 70% by weight, preferably about 2% to about 50% by weight, more preferably about 10% to about 30% by the total weight of the final doped support material. The doped support material is vacuum dried at about 100° C. to about 120° C. for about 2 hrs to about 12 hrs, preferably about 4 hours to about 6 hours to produce a dried, doped support material powder. The dried powder then is calcined in air. Calcination is performed in a furnace such as a muffle furnace under flowing air while heating at about 1° C./min to about 3° C./min to a temperature of about 500° C. to about 600° C. and holding at about 500° C. to about 600° C. for about 4 hours to about 8 hours, preferably about 6 hrs. The furnace then is turned off and naturally cooled to room temperature to produce a calcined, doped support material.

In manufacture of the catalyst, the calcined, doped support material is mixed with deionized water while stirring at about 60° C. to about 70° C. to achieve a slurry of the doped support material. An aqueous solution of one or more of catalyst metal precursors such as Rh nitrate Pt nitrate, Ru nitrate, Co nitrate, Fe nitrate, Mo nitrate, Cu nitrate, Zn nitrate, Ni nitrate, or mixtures thereof, where the amount of metal nitrates in the solution is based on the desired weight percent of the metal in the catalyst, is added to the slurry of doped support material. The resulting slurry is stirred at about 60° C. to about 70° C. to evaporate water to produce a catalyst powder. The resulting catalyst powder then is dried under vacuum at about 100° C. to about 120° C. for about 4 hrs to about 12 hrs. After drying, the catalyst powder is calcined in a muffle furnace under flowing air, and heated at about 1° C./min to about 3° C./min to a temperature of about 500° C. to about 600° C. and held at about 500° C. to about 600° C. for about 4 hrs to about 8 hrs, preferably about 6 hrs to produce a calcined catalyst powder. The calcined catalyst powder is then pelletized to produce a disk. The disk is crushed and sieved to a suitable size such as about 18-35 mesh. The sieved catalyst material is heated in a reducing gas such as flowing hydrogen, hydrogen in argon, or hydrogen in nitrogen gas, preferably flowing hydrogen at about 2° C./min to about 5° C./min to a temperature of about 500° C. to about 600° C. and held at about 500° C. to about 600° C. for about 5 hours to about 8 hours. The flow of hydrogen gas then is terminated to yield a metallic catalyst.

The invention is illustrated in more detail below by reference to the following non-limiting examples.

Catalyst Manufacture

Example 1

2% Rh-2% Ni-96% $CeO_2Al_2O_3$ where all Amounts are Based on the Total Weight of the Catalyst Aqueous slurry of gamma alumina is formed by adding 20 ml deionized water to 15 gm of UOP VGL-15 gamma alumina supplied by UOP Company. 10 ml of aqueous Ce nitrate solution formed by mixing 10 ml water and 9.46 gm Ce nitrate (Cerium (III) nitrate hexahydrate, 99.99% Aldrich) is added at the rate of 1 drop per sec with a pipette to 35 gm of aqueous slurry of UOP VGL-15 gamma alumina to form a treated slurry. The treated slurry is stirred at 65° C. to evaporate excess water and the resulting powder is dried under vacuum at 120° C. for 12 hours. The resulting dried support material is placed in a ceramic crucible and calcined in a muffle furnace under an air flow of 70 cc/min to produce $CeO_2Al_2O_3$ support material. During calcination the support material is heated at 1° C./min to 600° C. and held at 600° C. for 6 hrs. The furnace then is turned off and allowed to cool naturally to room temperature. Then, 4.8 gm of the calcined $CeO_2Al_2O_3$ support material is mixed with 10 ml deionized water while continuously stirring at 70° C. Then, 5 ml of an aqueous Rh, Ni nitrate solution formed by mixing 5 ml water, 1.00 gm Rh nitrate (Rhodium(III) nitrate solution, 10% (wt/wt)Rh in >5 wt. % nitric acid, Aldrich) and 0.4955 gram Ni nitrate (Nickel (II) nitrate hexahydrate, flake, Aldrich) is added drop-wise to 14.8 gms of the $CeO_2Al_2O_3$ slurry while stirring. The resulting treated $CeO_2Al_2O_3$ slurry is then continuously stirred at 65° C. until all water in liquid form is evaporated to produce a Rh, Ni catalyst precursor powder. The catalyst precursor powder is then dried under vacuum at 120° C. for 12 hrs. The dried catalyst precursor powder then is placed in a ceramic crucible and calcined in a muffle furnace with flowing air at 70 cc/min while heating at 1° C./min to 600° C. and holding at 600° C. for 6 hrs. The furnace then is shut off and allowed to cool to room temperature. The calcined catalyst powder is compressed in a pellet presser at 6000 PSI to produce a disk. The disk then is crushed and sieved to 18-35 mesh. The sieved catalyst is placed between two quartz wool layers inside a reactor tube under flowing hydrogen at a flow rate of 20 cc/min. While in the flowing hydrogen, the sieved catalyst is heated at 2° C./min to 500° C. and held at 500° C. for 5 hours. The furnace then is shut off, the door opened, and $N_2$ is passed through the furnace at 120 ml/min and allowed to cool to room temperature to yield 2% Rh-2% Ni-96% $CeO_2Al_2O_3$ bimetallic, noble-metal based catalyst product where all amounts are based on the total weight of the catalyst.

Example 2

2% Rh-5% Ni-93% $CeO_2Al_2O_3$ where all Amounts are Based on the Total Weight of the Catalyst The method of example 1 is employed except that 10 ml of catalyst metal nitrate solution formed by mixing 10 ml deionized water, 1.032 gm Rh nitrate and 1.29 gm Ni nitrate is added to the 14.8 gm of $CeO_2Al_2O_3$ slurry.

Example 3

2% Rh-10% Ni-88% $CeO_2Al_2O_3$ where all Amounts are Based on the Total Weight of the Catalyst

The method of example 1 is employed except that 15 ml of catalyst metal nitrate solution formed by mixing 15 ml deionized water, 1.091 gram Rh nitrate and 2.73 gm Ni nitrate is added to the 14.8 gm of $CeO_2Al_2O_3$ slurry.

Example 4

2% Rh-20% Ni-78% $CeO_2Al_2O_3$ where all Amounts are Based on the Total Weight of the Catalyst

The method of example 1 is employed except that 20 ml of catalyst metal nitrate solution formed by mixing 20 ml deionized water, 1.23 gm Rh nitrate and 6.16 gm Ni nitrate is added to 14.8 gm of the $CeO_2$—$Al_2O_3$ slurry.

Example 5

2% Rh-5% Ni-93% $Al_2O_3$ where all Amounts are Based on the Total Weight of the Catalyst

The procedure of example 2 is followed except that during the support material preparation, no Ce nitrate is added to the gamma alumina, and 10 ml of the catalyst metal nitrate solution is added to 14.8 gm of the gamma alumina slurry.

Example 1C

2% Rh-98% $CeO_2Al_2O_3$ where all Amounts are Based on the Total Weight of the Catalyst

The method of example 1 is employed except that 10 ml of Rh nitrate solution formed by mixing 10 ml deionized water and 0.9795 gm Rh nitrate is added to the $CeO_2Al_2O_3$ slurry.

Example 2C

5% Ni-95% $Al_2O_3$ where all Amounts are Based on the Total Weight of the Catalyst

The method of example 2 is employed except that during the support material preparation, no Ce nitrate is added to the gamma alumina. Then 10 ml of the nickel nitrate solution formed by mixing 10 ml deionized water and 1.25 gm Ni nitrate is added to the $Al_2O_3$ slurry.

Example 3C

5% Ni-95% $CeO_2Al_2O_3$ where all Amounts are Based on the Total Weight of the Catalyst

The method of example 2 is employed except that only 10 ml of nickel nitrate solution formed by mixing 10 ml deionized water and 1.26 gm Ni nitrate is added to the $CeO_2Al_2O_3$ slurry.

Example 4C

10% Ni-90% $CeO_2Al_2O_3$ where all Amounts are Based on the Total Weight of the Catalyst

The method of example 3 is employed except that only 15 ml of nickel nitrate solution formed by mixing 15 ml deionized water and 2.66 gm Ni nitrate is added to the $CeO_2Al_2O_3$ slurry.

Example 5C

2% Rh-5% Ni-93% $ZrO_2Al_2O_3$ where all Amounts are Based on the Total Weight of the Catalyst

The method of example 2 is employed except that 10 ml of aqueous Zr nitrate solution formed by mixing 10 ml water and 7.04 gm Zr nitrate (Zirconyl nitrate hexahydrate, 99.99% Aldrich) is substituted for the Ce nitrate solution.

Example 6C

2% Rh-5% Ni-93% $Ga_2O_3Al_2O_3$ where all Amounts are Based on the Total Weight of the Catalyst

The method of example 2 is employed except that only 15 ml of aqueous Ga nitrate solution formed by mixing 15 ml water and 18.06 gm Ga nitrate (Gadolinium (III) nitrate hexahydrate, 99.9%, Aldrich) is substituted for the Ce nitrate solution.

Example 7C

2% Rh-5% Ni-93% $La_2O_3Al_2O_3$ where all Amounts are Based on the Total Weight of the Catalyst

The method of example 2 is employed except that only 10 ml of aqueous La nitrate solution formed by mixing 10 ml water and 9.98 gm La nitrate (Lanthanum nitrate hexahydrate 98+%, ACROS) is substituted for the Ce Nitrate solution.

Steam Reforming

In steam reforming, the bimetallic and trimetallic catalysts are first treated in a reducing atmosphere such as hydrogen to produce an activated catalyst. A hydrocarbon fuel which may contain sulfur then is passed over the activated catalyst at an elevated temperature to produce hydrogen and/or synthesis gas. NORPAR-13 from Exxon Mobile Corp. loaded with a desired amount of S is employed as a model fuel for evaluating the sulfur-tolerance and carbon-resistance of the catalysts. NORPAR-13 is an industrial solvent that contains normal paraffins with an average carbon chain length of 13 and sulfur. The various NORPAR-13 fuels with differing sulfur concentration used in the examples below are prepared by doping 3-methylbenzothiophene into the initial NORPAR-13 to achieve a desired concentration of S. The amount of sulfur in parts per million by weight (ppmw) is indicated by the number that precedes "S" in "S NORPAR-13". To illustrate, 100 S NORPAR-13 is made by adding 0.216 g 3-methylbenzothiophene into about 500 g NORPAR-13 with stirring to achieve 100 ppmw sulfur in NORPAR-13 fuel.

Example A1

Steam Reforming of 100 S NORPAR-13 Model Liquid Fuel Containing 100 ppmw Sulfur Over the Catalyst of Example 1

One gram of the catalyst of example 1 that has a mesh size of 18-35 is loaded into a stainless steel tube reactor (0.54"

O.D., 0.375" I.D. and 24" in length). The catalyst is placed at the center of the tube between two beds of quartz wool. The remainder of the reactor is filled with alpha-alumina beads to reduce the dead volume. Then, the reactor is heated in a furnace at 2° C./min to 500° C. under a 20 cc/min flow of hydrogen gas and held at 500° C. for 5 hours to perform reduction of the catalyst. The hydrogen flow then is terminated and the gas flow is changed to a mixture of nitrogen (35 cc/min) and steam at a liquid water flow rate of 4.08 cc/hr. After 30 minutes, 100 S NORPAR-13 model fuel is introduced into the gaseous mixture of nitrogen and steam (about 20% $N_2$, 80% steam) at a flow rate of 1.38 cc/hr to achieve a steam to carbon molar ratio (S/C) of 3.0. After 30 minutes of fuel flow, the nitrogen flow is reduced to 1 cc/min. The total weight hourly space velocity (WHSV, defined as (g-reactants/(hr g-cat)) is 5.13/hr. As soon as the deactivation of the catalyst is observed as indicated by a rapid drop of fuel conversion, the nitrogen flow is increased to 120 cc/min and the flow of 100 S NORPAR-13 model fuel and steam are terminated. The resulting spent catalyst is allowed to cool to room temperature by turning off power to the furnace, opening the door of the furnace and passing $N_2$ through the furnace at 120 cc/min. All gas compositions are analyzed by an on-line SRI multigas analyzer equipped with a thermal conductivity detector. The conversion of the fuel to reformate is calculated according to the equation: Conv (%)=(1−(fuel$_{in}$−fuel$_{out}$)/fuel$_{in}$)*100%.

To determine the weight percent of carbon (wt %) on the spent catalyst, temperature programmed oxidation (TPO) of carbon is performed on a LECO RC-412 Multiphase Carbon Analyzer. TPO is performed by heating the spent catalyst at 30° C./min to 900° C. under ultra-pure oxygen to oxidize any carbon present on the spent catalyst to carbon dioxide. The amount of carbon dioxide generated is monitored by an IR cell and the amount of carbon is determined on the basis of the amount of carbon dioxide generated from the sample.

Example A2

Steam Reforming of 126 S NORPAR-13 Model Liquid Fuel Containing 126 ppmw Sulfur Over the Catalyst of Example 2

The procedure of example A1 is used except that the catalyst of example 2 is employed and the employed fuel is 126 S NORPAR-13.

Example A3

Steam Reforming of 100 S NORPAR-13 Model Liquid Fuel Containing 100 ppmw Sulfur Over the Catalyst of Example 3

The procedure of example A1 is used except that the catalyst of example 3 is employed.

Example A4

Steam Reforming of 126 S NORPAR-13 Model Liquid Fuel Containing 126 ppmw Sulfur Over the Catalyst of Example 4

The procedure of example A1 is used except that the catalyst of example 4 is employed and the employed fuel is 126 S NORPAR-13.

Example A5

Steam Reforming of 104 S NORPAR-13 Model Liquid Fuel Containing 104 ppmw Sulfur Over the Catalyst of Example 5

The procedure of example A1 is used except that the catalyst of example 5 is employed and the employed fuel is 104 S NORPAR-13.

Example A1C

Steam Reforming of 100 S NORPAR-13 Model Liquid Fuel Containing 100 ppmw Sulfur Over the Catalyst of Example 1C The procedure of example A1 is used except that the catalyst of example 1C is employed.

Example A2C

Steam Reforming of 33 S NORPAR-13 Model Liquid Fuel Containing 33 ppmw Sulfur Over the Catalyst of Example 2C The procedure of example A1 is used except that the catalyst of example 2C is employed and the employed fuel is 33 S NORPAR-13.

Example A3C

Steam Reforming of 104 S NORPAR-13 Model Liquid Fuel Containing 104 ppmw Sulfur Over the Catalyst of Example 3C The procedure of example A1 is used except that the catalyst of example 3C is employed and the employed fuel is 104 S NORPAR-13.

Example A4C

Steam Reforming of 104 S NORPAR-13 Model Liquid Fuel Containing 104 ppmw Sulfur Over the Catalyst of Example 4C The procedure of example A1 is used except that the catalyst of example 4C is employed and the employed fuel is 104 S NORPAR-13.

Example A6

Steam Reforming of 245 S NORPAR-13 Model Liquid Fuel Containing 245 ppmw Sulfur Over the Catalyst of Example 2

The procedure of example A1 is used except that the catalyst of example 2 is employed and the employed fuel is 245 S NORPAR-13.

Example A7

Steam Reforming of 245 S NORPAR-13 Model Liquid Fuel Containing 245 ppmw Sulfur Over the Catalyst of Example 5

The procedure of example A1 is used except that the catalyst of example 5 is employed and the employed fuel is 245 S NORPAR-13.

Example A5C

Steam Reforming of 245 S NORPAR-13 Model Liquid Fuel Containing 245 ppmw Sulfur Over the Catalyst of Example 5C

The procedure of example A1 is used except that the catalyst of example 5C is employed and the employed fuel is 245 S NORPAR-13.

Example A6C

Steam Reforming of 245 S NORPAR-13 Model Liquid Fuel Containing 245 ppmw Sulfur Over the Catalyst of Example 6C

The procedure of example A1 is used except that the catalyst of example 6C is employed and the employed fuel is 245 S NORPAR-13.

Example A7C

Steam reforming of 245 S NORPAR-13 Model Liquid Fuel Containing 245 ppmw Sulfur Over the Catalyst of Example 7C

The procedure of example A1 is used except that the catalyst of example 7C is employed and the employed fuel is 245 S NORPAR-13.

The results of examples A1-A7C are summarized in Table 1.

Examples 6-9 illustrate the manufacture of Ca and K modified Rh—Ni bimetallic catalysts supported on $CeO_2Al_2O_3$ materials.

Example 6

2% Rh-10% Ni-3% Ca-85% $CeO_2Al_2O_3$ Catalyst (all Amounts Based on Total Weight of Catalyst)

2.77 gm of 20% $CeO_2$-80% $Al_2O_3$ support material is mixed with 10 ml deionized water to make a uniform slurry while stirring at 60° C. to yield a support material slurry. 10 ml of an aqueous solution of 0.69 gram Rh nitrate, 1.76 gram Ni nitrate and 1.02 gram Ca nitrate from Aldrich is added at 1-2 drops per sec by a glass pipette to 12.77 gms of the support slurry while stirring to produce a treated slurry. The treated slurry is stirred at 80° C. to evaporate excess water. The resulting powder is then dried under vacuum, calcined, compressed, crushed, sieved and reduced in hydrogen as in Example 1 to yield 2% Rh-10% Ni-3% Ca-85% $CeO_2Al_2O_3$ catalyst product.

Example 7

2% Rh-10% Ni-15% Ca-73% $CeO_2Al_2O_3$ Catalyst (all Amounts Based on Total Weight of Catalyst)

The procedure of example 6 is employed except that 2.38 g of 20% $CeO_2$-80% $Al_2O_3$ is employed to make a support slurry and 10 ml of a solution formed from 10 ml deionized

TABLE 1

| Ex. | Catalyst | Initial S conc. of NORPAR-13[2] | TOS[3], hrs. | Initial Conversion of fuel at time = 0 | Final Conversion of fuel at time = TOS | Carbon Wt. % |
|---|---|---|---|---|---|---|
| A1 | 2% Rh-2% Ni/$CeO_2Al_2O_3$ | 100 ppm | 10 | 98% | 92% | 3.06[1] |
| A2 | 2% Rh-5% Ni/$CeO_2Al_2O_3$ | 126 ppm | 16 | 99 | 66 | 2.96[1] |
| A3 | 2% Rh-10% Ni/$CeO_2Al_2O_3$ | 100 ppm | 32 | 100 | 65 | 24.7[1,2] |
| A4 | 2% Rh-20% Ni/$CeO_2Al_2O_3$ | 126 ppm | 42 | 98 | 78 | 34.4 |
| A5 | 2% Rh-5% Ni/$Al_2O_3$ | 104 ppm | 19 | 100 | 71 | 4.89 |
| A1C | 2% Rh/$CeO_2Al_2O_3$ | 100 ppm | 10 | 100 | 59 | 2.99[1] |
| A2C | 5% Ni/$Al_2O_3$ | 33 ppm | 4.5 | 80 | 5 | 13.7 |
| A3C | 5% Ni/$CeO_2Al_2O_3$ | 104 ppm | 3.5 | 98 | 35 | 14.9 |
| A4C | 10% Ni/$CeO_2Al_2O_3$ | 104 ppm | 5.0 | 95 | 98 | — |
| A6 | 2% Rh 5% Ni/$CeO_2Al_2O_3$ | 245 ppm | 12.0 | 97.3 | 81.2 | 2.16 |
| A7 | 2% Rh 5% Ni/$Al_2O_3$ | 245 ppm | 6.5 | 97.6 | 67.1 | 2.7 |
| A5C | 2% Rh 5% Ni/$ZrO_2Al_2O_3$ | 245 ppm | 20 | 98.6 | 60.2 | 1.2 |
| A6C | 2% Rh 5% Ni/$Ga_2O_3Al_2O_3$ | 245 ppm | 14 | 99 | 67 | 2.71 |
| A7C | 2% Rh 5% Ni/$La_2O_3Al_2O_3$ | 245 ppm | 7.5 | 97.1 | 82.2 | 0.34 |

[1]Deactivation due to carbon formation rather than sulfur poisoning
[2]Sulfur concentration in the NORPAR-13 fuel, analyzed by Antek 9000ES total sulfur analyzer
[3]Time on stream water, 0.69 gram Rh nitrate, 1.76 gram Ni nitrate and 3.06 gram Ca nitrate is added to the support slurry.

Example 8

2% Rh-10% Ni-3% K-85% $CeO_2Al_2O_3$ Catalyst

The procedure of example 6 is followed except that 10 ml of a solution formed from 10 ml deionized water, 0.69 gram Rh nitrate, 1.76 gram Ni nitrate and 0.27 gram K nitrate is added to the support slurry.

Example 9

2% Rh-10% Ni-15% K-73% $CeO_2Al_2O_3$ (all Amounts Based on Total Weight of Catalyst)

The procedure of example 6 is followed except that 2.38 g of 20% $CeO_2$-80% $Al_2O_3$ is employed to make a support slurry and 10 ml of a solution formed from 10 ml deionized water, 0.69 gram Rh nitrate, 1.76 gram Ni nitrate and 1.25 gram K nitrate is added to the support slurry.

Examples A8 to A11 illustrate steam reforming of 120 S NORPAR-13 model liquid fuel containing 120 ppmw sulfur over the catalysts of examples 6-9

Example A8

Steam Reforming of 120 S NORPAR-13 Model Liquid Fuel Containing 120 ppmw Sulfur Over the Catalyst of Example 6

The procedure of example A1 is followed except that the catalyst of example 6 is employed and the fuel is 120 S NORPAR-13.

Example A9

Steam Reforming of 120 S NORPAR-13 Model Liquid Fuel Containing 120 ppmw Sulfur Over the Catalyst of Example 7

The procedure of example A1 is followed except that the catalyst of example 7 is employed and the fuel is 120 S NORPAR-13.

Example A10

Steam Reforming of 120 S NORPAR-13 Model Liquid Fuel Containing 120 ppmw Sulfur Over the Catalyst of Example 8

The procedure of example A1 is used except that the catalyst of example 8 is employed and the fuel is 120 S NORPAR-13.

Example A11

Steam Reforming of 120 S NORPAR-13 Model Liquid Fuel Containing 120 ppmw Sulfur Over the Catalyst of Example 9

The procedure of example A1 is used except that the catalyst of example 9 is employed and the fuel is 120 S NORPAR-13.

Examples 10-15 illustrate the manufacture of tri-metallic catalysts as well as Co and Ni—Co catalysts.

Example 10

2% Rh-6% Ni-6% Co-86% $CeO_2Al_2O_3$ Catalyst (all Amounts Based on Total Weight of Catalyst)

The catalyst is made according to the procedure of example 1 except that 10 ml of a catalyst metal nitrate solution formed from 10 ml of deionized water, 1.129 gram Rh-nitrate, 1.694 gram Ni-nitrate and 1.673 gram Co-nitrate is substituted for the Rh and Ni nitrate solution in example 1.

Example 11

2% Rh-5% Ni-5% Co-88% $CeO_2Al_2O_3$ Catalyst (all Amounts Based on Total Weight of Catalyst)

The catalyst is made according to the procedure of example 1 except that 5.4 g of calcined 20% $CeO_2$-80% $Al_2O_3$ is employed to make a support slurry and 10 ml of a catalyst metal nitrate solution formed from 10 ml deionized water, 1.23 gram Rh-nitrate, 1.524 gram Ni-nitrate and Co-nitrate is added to the $CeO_2Al_2O_3$ slurry.

Example 12

2% Rh-5% Ni-5% Co-88% $Y_2O_3CeO_2Al_2O_3$ (2% $Y_2O_3$ and 18% $CeO_2$ in $Al_2O_3$) Catalyst (all Amounts Based on Total Weight of Catalyst and Support Material)

The catalyst is made according to the procedure of example 1 except the 4.8 gm of gamma alumina is treated with 10 ml metal solution formed from 10 ml deionized water, 0.407 gram Y nitrate hexahydrate from Aldrich and 2.72 gram Ce nitrate to yield the 2% $Y_2O_3$ 18% $CeO_2$-80% $Al_2O_3$ support material. Then, 6.6 gm of the calcined 2% $Y_2O_3$ 18% $CeO_2$-80% $Al_2O_3$ produced is employed to make a support slurry and 10 ml of a catalyst metal nitrate solution formed from 10 ml deionized water, 1.5 gram Rh-nitrate, 1.86 gram Ni-nitrate and 1.85 gram Co-nitrate is added to the $Y_2O_3$—$CeO_2$—$Al_2O_3$ slurry.

Example 13

2% Rh-5% Ni-5% Co-88% $ZrO_2Al_2O_3$ Catalyst, where all Amounts are Based on the Total Weight of the Catalyst The catalyst is made according to the procedure of example 1 except that 10 ml of aqueous Zr nitrate solution formed by mixing 10 ml water and 7.04 gm Zr nitrate (Zirconyl nitrate hexahydrate, 99.99% Aldrich) is substituted for Ce nitrate solution to produce a support slurry. Then, 3.08 gm of the calcined 20% $ZrO_2$-80% $Al_2O_3$ support is employed to make a $ZrO_2Al_2O_3$ support slurry and 10 ml of a catalyst metal nitrate solution formed from 10 ml deionized water, 0.706 gm Rh-nitrate, 0.867 gm Ni-nitrate and 0.866 gm Co-nitrate is added to the $ZrO_2Al_2O_3$ slurry.

Example 14

5% Co-95% $CeO_2Al_2O_3$ Catalyst (all Amounts Based on Total Weight of Catalyst)

The catalyst is made according to the procedure of example 1 except that 10 ml of a catalyst metal nitrate solution formed from 10 ml deionized water, 1.524 gram Co-nitrate is added to the $CeO_2Al_2O_3$ slurry.

Example 15

10% Ni-5% Co-85% $CeO_2Al_2O_3$ Catalyst (all Amounts Based on Total Weight of Catalyst)

The catalyst is made according to the procedure of example 1 except that 10 ml of a catalyst metal nitrate solution formed from 10 ml deionized water, 2.999 gram Ni-nitrate and 1.524 gram Co-nitrate is added to the $CeO_2Al_2O_3$ slurry.
Example A12 illustrates steam reforming of JP-8 containing 25 ppmw sulfur over the catalyst of example 10.

The procedure of example A1 is followed except that the catalyst of example 10 is used and the hydrocarbon fuel used is 25 ppmw S JP-8 from Altex Technology Corp.
Examples A13-1 to A13-5 illustrate steam reforming of 25 ppmw S JP8 over the catalyst of example 11.

Example A13-1

The procedure of example A1 is followed except that the catalyst of example 11 is employed and the hydrocarbon fuel used is 25 ppmw S JP-8 from Altex Technology Corp. At time on stream of 0.5 hr, the conversion is 100% and the relative pressure drop is 0. The conversion is calculated as in example A1. The relative pressure drop is calculated by the equation: $((Pressure_{(at\ time\ t)} - Pressure_{(at\ time\ zero)})/Pressure_{(at\ time\ zero)}) * 100\% = \%$ pressure drop. Pressure is directly measured with a pressure transducer.

Example A13-2

The procedure of example A1 is followed except that the catalyst of example 11 is employed and the hydrocarbon fuel used is 25 ppmw S JP-8 from Altex Technology Corp. At time on stream of 8 hrs, the conversion is 100% and there is no increase in pressure.

Example A13-3

The procedure of example A1 is followed except that the catalyst of example 11 is employed and the hydrocarbon fuel used is 25 ppmw S JP-8 from Altex Technology Corp. At time on stream of 25 hrs, the conversion is 100% and there is no increase in pressure.

Example A13-4

The procedure of example A1 is followed except that the catalyst of example 11 is employed and the hydrocarbon fuel used is 25 ppmw S JP-8 from Altex Technology Corp. At time on stream of 55 hrs, the fuel conversion is 98% and there is no increase in pressure.

Example A13-5

The procedure of example A1 is followed except that the catalyst of example 11 is employed and the hydrocarbon fuel used is 25 ppmw S JP-8 from Altex Technology Corp. At time on stream of 78 hrs, the conversion is 90% and there is no increase in pressure.
Examples A14-1 to A14-5 illustrate steam reforming of 25 ppmw S JP-8 over the catalyst of example 12 with no hydrogen reduction prior to reforming. Reforming is performed as described in example A1 except that after the catalyst is placed in the reactor tube, the gas flow is only nitrogen during heating of the furnace.

Example A14-1

The procedure of example A1 is followed except that the catalyst of example 12 is employed, the hydrocarbon fuel used is 25 ppmw S JP-8 from Altex Technology Corp and no hydrogen reduction is performed. At time on stream of 0.5 hours, the conversion is 92%.

Example A14-2

The procedure of example A1 is followed except that the catalyst of example 12 is employed, the hydrocarbon fuel used is 25 ppmw S JP-8 from Altex Technology Corp and no hydrogen reduction is performed. At time on stream of 12 hours, the conversion increased to 99%.

Example A14-3

The procedure of example A1 is followed except that the catalyst of example 12 is employed, the hydrocarbon fuel used is 25 ppmw S JP-8 from Altex Technology Corp and no hydrogen reduction is performed. At time on stream of 30 hours, the conversion increased to 100%.

Example A14-4

The procedure of example A1 is followed except that the catalyst of example 12 is employed, the hydrocarbon fuel used is 25 ppmw S JP-8 from Altex Technology Corp and no hydrogen reduction is performed. At time on stream of 35 hours, the conversion maintained activity at 100%.

Example A14-5

The procedure of example A1 is followed except that the catalyst of example 12 is employed, the hydrocarbon fuel used is 25 ppmw S JP-8 from Altex Technology Corp and no hydrogen reduction is performed. At time on stream of 81 hours, the conversion maintained activity at 100%.
Examples A14-6 to A14-10 show the performance of the catalyst of example 12 during sudden shut-down and start-ups during steam reforming of 25 ppms S JP-8. Reforming is conducted under the same conditions as those in example A14. However, at a time on stream of 43 hours all fuel and steam flows are stopped and the reactor begins to cool. 5 hours later, the system is heated to 515° C. in nitrogen flow of 35 cc/min and the steam and fuel are reintroduced (at a time on stream of 47 hours).

Example A14-6

The procedure of example A1 is followed except that the catalyst of example 12 is employed, the hydrocarbon fuel used is 25 ppmw S JP-8 from Altex Technology Corp and no hydrogen reduction is performed. At time on stream of 0.5 hours, the conversion is 100%.

Example A14-7

The procedure of example A10 is followed except that the catalyst of example 12 is employed, the hydrocarbon fuel used is 25 ppmw S JP-8 from Altex Technology Corp and no hydrogen reduction is performed. At time on stream of 22 hours, the conversion is 100%.

Example A14-8

The procedure of example A10 is followed except that the catalyst of example 12 is employed, the hydrocarbon fuel used is 25 ppmw S JP-8 from Altex Technology Corp and no hydrogen reduction is performed. At time on stream of 38 hours, the conversion is 100%.

Example A14-9

The procedure of example A10 is followed except that the catalyst of example 12 is employed, the hydrocarbon fuel used is 25 ppmw S JP-8 from Altex Technology Corp and no hydrogen reduction is performed. At time on stream of 58 hours, the conversion is 100%.

Example A14-10

The procedure of example A10 is followed except that the catalyst of example 12 is employed, the hydrocarbon fuel used is 25 ppmw S JP-8 from Altex Technology Corp and no hydrogen reduction is performed. At time on stream of 80 hours, the conversion is 88%.

Examples A14-11 to A14-15 illustrate the use of the catalyst of example 12 in oxidative steam reforming of 12 ppmw S diesel fuel from Altex. Steam reforming is performed as in example 12 except that an oxygen flow (2 ml/min) is added.

Example A14-11

The procedure of example A1 is followed except that the catalyst of example 12 is employed, the hydrocarbon fuel used is 12 ppmw S diesel fuel from Altex Technology Corp and an oxygen flow (2 ml/min) is added. At time on stream of 0.5 hours, the conversion is 100%.

Example A14-12

The procedure of example A1 is followed except that the catalyst of example 12 is employed, the hydrocarbon fuel used is 12 ppmw S diesel fuel from Altex Technology Corp and an oxygen flow (2 ml/min) is added. At time on stream of 4.5 hours, the conversion is 100%.

Example A14-13

The procedure of example A1 is followed except that the catalyst of example 12 is employed, the hydrocarbon fuel used is 12 ppmw S diesel fuel from Altex Technology Corp and an oxygen flow (2 ml/min) is added. At time on stream of 18 hours, the conversion is 100%.

Example A14-14

The procedure of example A1 is followed except that the catalyst of example 12 is employed, the hydrocarbon fuel used is 12 ppmw S diesel fuel from Altex Technology Corp and an oxygen flow (2 ml/min) is added. At time on stream of 28 hours, the conversion is 100%.

Example A14-15

The procedure of example A1 is followed except that the catalyst of example 12 is employed, the hydrocarbon fuel used is 12 ppmw S diesel fuel from Altex Technology Corp and an oxygen flow (2 ml/min) is added. At time on stream of 72 hours, the conversion is 100%.

Examples A14-16 to A14-20 illustrate the regeneration of the catalyst of example 12 after initial deactivation due to S poisoning during oxidative steam reforming of 55 ppm S diesel fuel.

Example A14-16

Steam reforming is performed as in example A14-11 except that, after sampling, the reactants (fuel and water) are shut off and air is introduced into the system at a flow of 100 cc/min for 1 hour to regenerate the catalyst. After 1 hour of air regeneration the steam, fuel, are turned back on at their original flow rates. At time on stream of 0.5 hours, the conversion is 99.5%.

Example A14-17

The procedure of example A14-16 is followed except that the catalyst of example 12 is employed. At time on stream of 4.5 hours, the conversion is 100%.

Example A14-18

The procedure of example A14-16 is followed except that the catalyst of example 12 is employed. At time on stream of 23 hours, the conversion is 100%.

Example A14-19

The procedure of example A14-16 is followed except that the catalyst of example 12 is employed. At time on stream of 33 hours, the conversion is 99%.

Example A14-20

The procedure of example A14-16 is followed except that the catalyst of example 12 is employed. At time on stream of 35 hours, the conversion is 91% showing that after air treatment the catalyst activity recovered, but not to its original level.

Example A15 illustrates steam reforming of JP-8 containing 3.6 ppmw sulfur over the catalyst of example 13.

The procedure of example A1 is followed except that the catalyst of example 13 is used and the hydrocarbon fuel is 3.6 ppmw S JP-8 from Altex Technology Corp. The size of the tube reactor is 0.375" O.D., 0.265" I.D. and 17" in length. The weight of the catalyst is 0.5034 gram and the temperature for steam reforming is 550° C. The fuel and water flowrate is 0.72 ml/h and 2.04 ml/h, respectively. The initial conversion is 100%. It is 100% at time on stream (TOS) of 104 hrs and 97.7% at TOS of 124.5 hrs. At TOS of 144.5 hrs, the conversion is 89.8%.

Examples A16 and A17 illustrate the steam reforming of NORPAR-13 over the non-noble-metal based metallic catalysts.

Example A16

The procedure of example A1 is followed except that the catalyst of example 13 is employed and the fuel is NORPAR- 13. At time on stream of 2 hours, the conversion is 5.8%, showing the ineffectiveness of cobalt alone on the steam reforming.

Example A17

The procedure of example A1 is followed except that the catalyst of example 14 is employed and the fuel is NORPAR-13. At time on stream of 6 hours, the fuel conversion is 100%.

In examples A18-A26 below, the total wt % carbon detected is the amount of carbon defined by: (g-carbon/g-total)*100, where g-total refers to the total weight of the catalyst after reforming (includes catalyst weight and any carbon). The g-carbon number is obtained using the LECO RC-412 multiphase carbon analyzer (as described above).

Example A18

The procedure of example A14-16 is followed except that the catalyst of example 1C is employed and the fuel is 4 S NORPAR-13. The initial conversion at time=0 hrs is 100% and the final conversion at time on stream of 72 hours is 96%. The total wt. % Carbon is 2.99.

Example A18-1

The procedure of example A14-16 is followed except that the catalyst of example 1C is employed and the fuel is 100 S NORPAR-13. The initial conversion at time=0 hrs is 100% and the final conversion at time on stream of 10 hours is 96%. The total wt. % Carbon is 3.15.

Example A19

The procedure of example A14-16 is followed except that the catalyst employed is 2% Rh-98% $Al_2O_3$ and the fuel is 4 S NORPAR-13. The catalyst is made according to the procedure of example 5 except that 1.02 gram Rh nitrate only is employed. The initial conversion at time=0 hrs is 98% and the final conversion at time on stream of 10 hours is 96%. The total wt. % Carbon is 3.89.

Example A20

The procedure of example A14-16 is followed except that the catalyst of example 4C is employed and the fuel is 100 S NORPAR-13. The initial conversion at time=0 hrs is 100% and the final conversion at time on stream of 5 hours is 99%.

Example A21

The procedure of example A14-16 is followed except that the catalyst of example 2 is employed and the fuel is 126 S NORPAR-13. The initial conversion at time=0 hrs is 98% and the final conversion at time on stream of 16 hours is 96%. The total wt. % Carbon is 2.96.

Example A22

The procedure of example A14-16 is followed except that the catalyst of example 3 is employed and the fuel is 100 ppm S NORPAR-13. The initial conversion at time=0 hrs is 99% and the final conversion at time on stream of 43 hours is 65%. The total wt. % Carbon is 24.7.

Example A22-1

The procedure of example A14-16 is followed except that the catalyst of example 2 is employed and the fuel is 22 ppm S JP-8. The initial conversion at time=0 hrs is 100% and the final conversion at time on stream of 72 hours is 95%. The total wt. % Carbon is 15.8.

Example A23

The procedure of example A14-16 is followed except that the catalyst of example 3 is employed and the fuel is 17 ppm S JP-8. The initial conversion at time=0 hrs is 100% and the final conversion at time on stream of 38 hours is 95%. The total wt. % Carbon is 19.7.

Example A24

The procedure of example A14-16 is followed except that the catalyst of example 11 is employed and the fuel is 22 ppm S JP-8. The initial conversion at time=0 hrs is 100% and the final conversion at time on stream of 78 hours is 85%. The total wt. % Carbon is 3.03.

Example A25

The procedure of example A14-16 is followed except that the catalyst of example 12 is employed and the fuel is 22 ppm S JP-8. The initial conversion at time=0 hrs is 100% and the final conversion at time on stream of 78 hours is 90%. The total wt. % Carbon is 2.98.

Example A26

The procedure of example A14-16 is followed except that the catalyst of example 12 is employed and the fuel is 19 ppm S Diesel. The initial conversion at time=0 hrs is 100% and the final conversion at time on stream of 72 hours is 100%. The total wt. % Carbon is 4.63.

The invention claimed is:

1. A sulfur-tolerant and carbon-resistant noble-metal based trimetallic catalyst of the formula M1(x)M2(y)M3(z) on a metal oxide doped stabilized gamma alumina support where $0.5\% \leq x \leq 5\%$, $2\% \leq y \leq 20\%$ and $2\% \leq z \leq 20\%$ where all amounts of x, y and z are based on total weight of the catalyst including the support, and where M1 is selected from the group consisting of Rh, Ru, and Pt, M2 and M3 are different and each is selected from the group consisting of Ni, Co, Fe, Mo, Cu, and Zn and where the metal oxide is any one or more of Ce, Zr, Ga or Y oxide and where the amount of metal oxide in the doped support is more than 10 wt. % to about 70 wt. % based on total weight of the doped support.

2. The catalyst of claim 1 where M1 is Rh, M2 is Ni, M3 is Co and R metal oxide is $CeO_2$ where the amount of $CeO_2$ in the doped support is more than 10 wt. % to about 70 wt. % based on total weight of the doped support.

3. The catalyst of claim 1 wherein the metal oxide is any one or more of $ZrO_2$, $Ga_2O_3$, or $Y_2O_3$ and where the amount of metal oxide in the doped support is more than 10 wt. % to about 70 wt. % based on total weight of the doped support.

* * * * *